No. 753,619. PATENTED MAR. 1, 1904.
W. W. O'CONNOR.
ANTIFRICTION BEARING.
APPLICATION FILED JUNE 10, 1903.
NO MODEL.

Witnesses
R. H. Butler,
O. E. Potter.

Inventor,
W. W. O'Connor,
By N. C. Everitt Co.
Attorneys.

No. 753,619. Patented March 1, 1904.

UNITED STATES PATENT OFFICE.

WALTER W. O'CONNOR, OF EAST PITTSBURG, PENNSYLVANIA.

ANTIFRICTION-BEARING.

SPECIFICATION forming part of Letters Patent No. 753,619, dated March 1, 1904.

Application filed June 10, 1903. Serial No. 160,816. (No model.)

*To all whom it may concern:*

Be it known that I, WALTER W. O'CONNOR, a subject of the King of Great Britain, residing at East Pittsburg, in the county of Allegheny and State of Pennsylvania, have invented certain new and useful Improvements in Antifriction-Bearings, of which the following is a specification, reference being had therein to the accompanying drawings.

This invention relates to certain new and useful improvements in antifriction-bearings, and more particularly to that class employed upon vehicles and the like.

In describing the invention in detail reference is had to the accompanying drawings, forming a part of this specification, and wherein like numerals of reference indicate like parts throughout the several views, in which—

Figure 1:
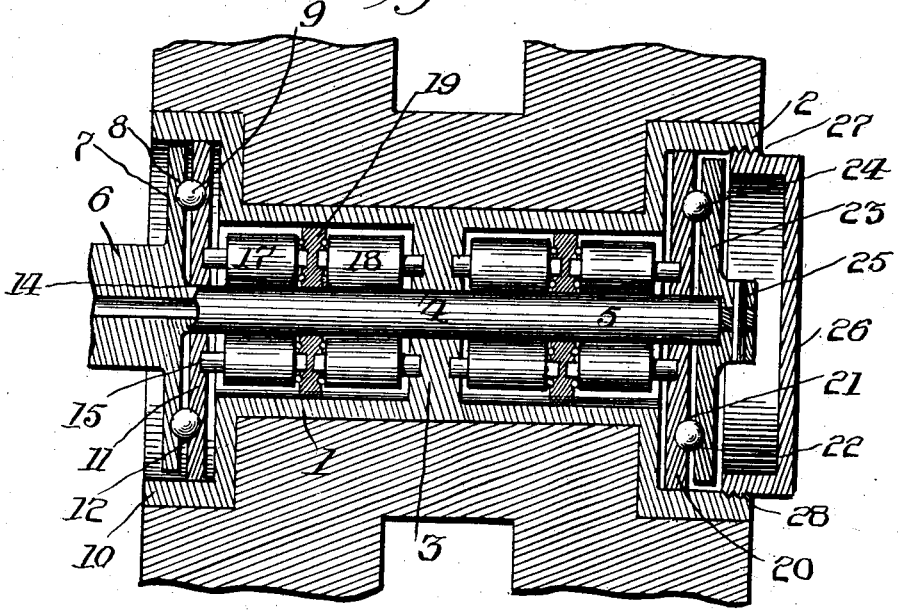
Figure 2:
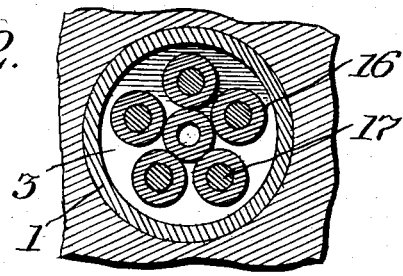
Figure 3:
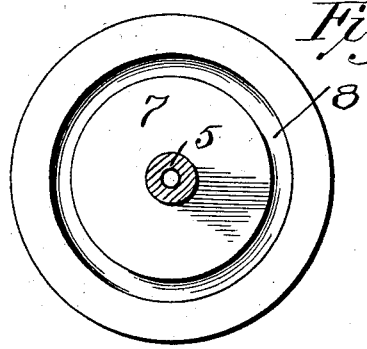

Figure 1 is a longitudinal sectional view of the hub of a wheel, showing my improved bearings in position. Fig. 2 is a cross-section taken through the central part of the casing containing the bearings, and Fig. 3 is a side elevation of one of the annular plates carried upon the shank portion of the axle.

In the accompanying drawings I have shown my antifriction-bearing secured in the hub of a wheel, and in carrying out my invention I provide a tubular casing 1, having the enlarged tubular ends 2. Centrally of the tubular casing 1 I provide a partition 3, having an aperture 4 formed therein, through which passes the shank 5 of the axle 6. This axle, near the shank portion thereof, carries the annular flange 7, having a race 8 formed in its face, in which are partially mounted the balls 9. In the enlarged tubular end 10 of the casing 1 is mounted the annular plate 11, said plate being formed with a race 12, which engages the balls 9, also partially carried within the race 8 of the plate 7. This plate 11 has a central aperture 14, through which passes the shank 5 of the hub, and in the inner face of this plate 11 is formed a plurality of recesses 15, in which are mounted the spindles 16 of the rollers 17.

19 indicates annular collars which loosely encircle the shank 5, one being arranged on each side of the partition 3 between the rollers thereof and in which are journaled the adjacent ends of the rollers 17 and 18.

In the tubular end 2 of the tubular casing 1 I secure an annular plate 20, similar in construction to the plate 11, carried upon the inner end of the shank, the plate 20 bearing an annular race 21, and in said race are partially mounted the balls 22. To secure said balls in position, I employ an annular plate 23, formed with a race 24, said plate being secured by any suitable means upon the outer end of the shank 5 of the axle, and in Fig. 1 of the drawings I have illustrated this annular plate 23 as being secured upon the same by means of a pin 25. Mounted between the annular plate 20 and the central partition 3, carried within the tubular casing 1, are a plurality of rollers similar in construction to those mounted upon the opposite side of the partition. To protect the annular plates carried within the enlarged tubular end 2, I provide a cap 26, havings threads 27, which engage threads 28 of the enlarged tubular end 2.

When it is desired to clean and oil the rollers and bearings forming my invention, the cap 26 is removed and the pin 25 is withdrawn, whereby the plate 23 may be removed and the shank 5 of the axle may be oiled from the exterior side of the annular plate 20, and when it is desired to remove the rollers from the tubular casing the annular plate 20 is removed, whereby the rollers on that side of the partition 3 may be withdrawn. To remove the rollers within the other side of the partition, the shank 5 will have to be drawn.

While I have herein shown my improved antifriction-bearings constructed within the hub of a wheel, it is obvious that by changing the construction of the casing my improved antifriction rollers and bearings may be employed upon other objects wherein friction is to be reduced to a minimum.

It will be noted that various changes may be made in the details of construction without departing from the general spirit of my invention.

Having fully described my invention, what

I claim as new, and desire to secure by Letters Patent, is—

In combination with the casing formed with a central partition, an axle having its shank passing through said partition, plates mounted on said shank adjacent the opposite ends of said casing, collars loosely mounted on said shank between said partition and plates, rollers arranged in said casing and engaging said shank, said rollers being arranged on opposite sides of the collars and having their spindles journaled in said collars, plates and partition, respectively, and means for preventing accidental displacement of said shank.

In testimony whereof I affix my signature in the presence of two witnesses.

WALTER W. O'CONNOR.

Witnesses:
EMA E. POTTER,
KARL H. BUTLER.